Patented Feb. 11, 1941

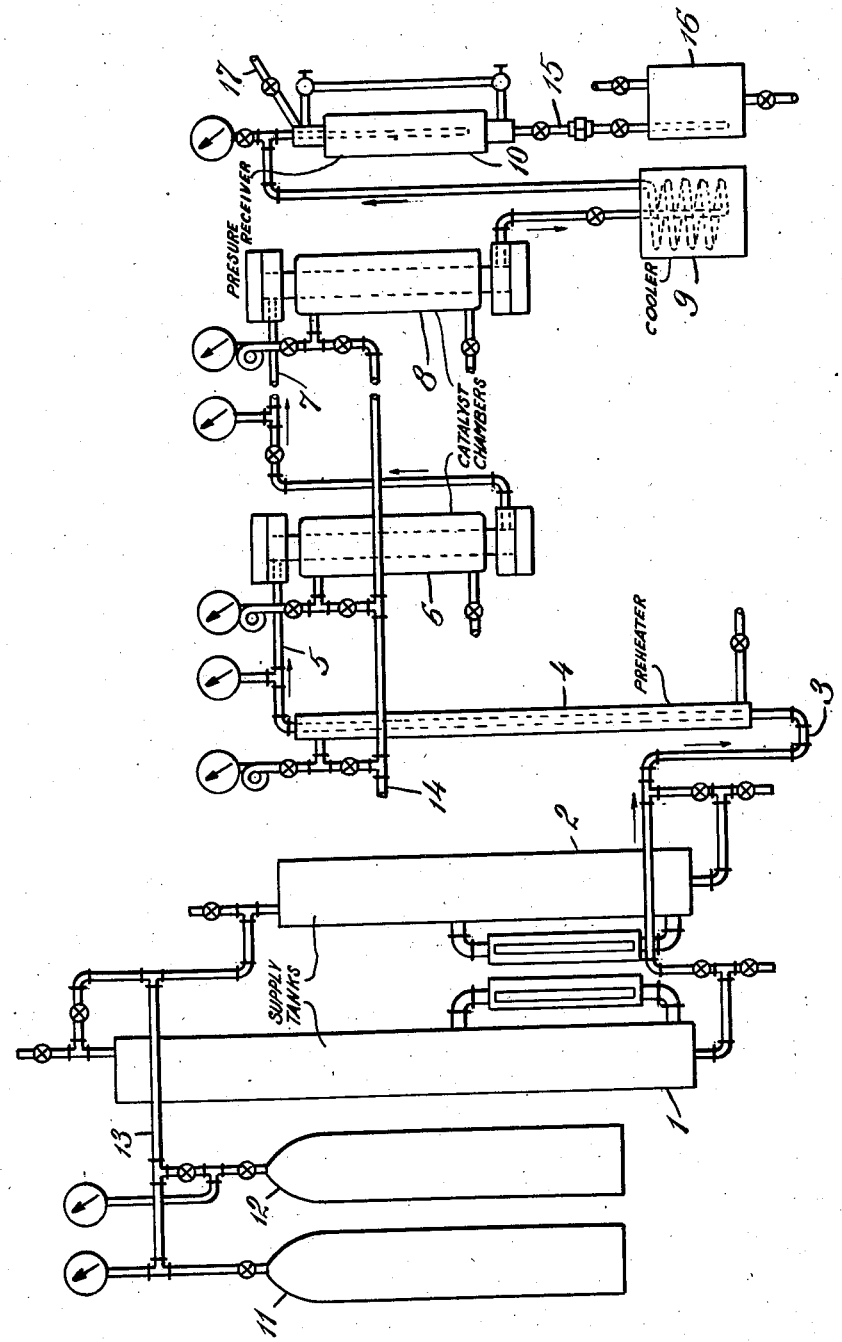

2,231,831

UNITED STATES PATENT OFFICE 2,231,831

CATALYTIC CONDENSATION OF HYDROCARBONS

Roderick Donald Pinkerton, Chicago, Ill., assignor to Sinclair Refining Company, New York, N. Y., a corporation of Maine Application August 20, 1938, Serial No. 225,863

5 Claims. (Cl. 196—10)

This invention relates to improvements in the catalytic condensation of normally gaseous hydrocarbons to produce normally liquid hydrocarbons of gasoline boiling range.

The normally gaseous hydrocarbons to which I refer more particularly are those saturated, or paraffin, and unsaturated, or olefin, hydrocarbons containing four and less carbon atoms per molecule, methane, ethane, ethylene, propane, propylene, normal butane, isobutane, normal butylene and isobutylene. These hydrocarbons may be designated the $C_1$, $C_2$, $C_3$ and $C_4$ compounds, or collectively $C_{4-}$ compounds. The normally liquid hydrocarbons to which I refer are those containing five or six or more carbon atoms per molecule within the boiling range of gasoline, which may be designated the $C_{5+}$ compounds.

The term "catalytic condensation" as applied to such hydrocarbons includes polymerization of unsaturates and alkylation or reaction between saturates and unsaturates. Catalytic polymerization of unsaturates has been proposed and practiced as a method of recovering motor fuel gasoline of special value from less valuable hydrocarbon gas mixtures containing sufficient unsaturated compounds. Gas mixtures so processed have included gas mixtures from cracking operations containing as produced sufficient unsaturated components and gas mixtures preliminarily processed catalytically or thermally to produce sufficient unsaturated components by decomposition of saturated components. While some of these previous proposals and practices may have involved incidental alkylation, the conditions of operation have tended to suppress alkylation rather than promote this type of reaction. Alkylation and polymerization are, in some respects, inconsistent reactions and, consequently, it is not unnatural that those seeking to effect condensation by polymerization should have avoided conditions promoting alkylation.

In a copending application, Serial No. 204,736, filed April 28, 1938, (Patent No. 2,177,579) William Mendius and I disclose that, by appropriate correlation of charging stock, temperature, pressure and catalyst, condensation with substantial alkylation may be effected either with concurrent polymerization or to the substantial exclusion of polymerization and that, by means of such correlation, gasoline-like hydrocarbon products superior in important respects to those of polymerization processes in which alkylation, if occurring at all, is merely incidental, may be produced from normally gaseous hydrocarbons including saturates and unsaturates.

According to this invention, the condensation is effected in a plurality of stages operated under progressively lower pressures. The first stage is operated under a pressure, and at a temperature, promoting alkylation, and in succeeding stages lower pressures tending to promote polymerization are used. Succeeding stages also may be operated at progressively higher temperatures, such higher temperatures further tending to promote polymerization in successive stages. Several advantages are thus secured. First, more complete reaction of unsaturates is effected without limiting the extent to which alkylation is effected Second, the average effective life of the catalyst is improved in that decreasing pressures, and increasing temperatures if they are used, promote the desorption of liquid condensation products in the later stage or stages of catalyst contact. Third, since somewhat lower pressures apparently are effective for alkylation as the concentration of liquid condensation products increases, lower average pressures may be made effective for the production of comparable recoveries.

In carrying out the process of the invention, the first stage of catalyst contact, or the first two or three stages of catalyst contact, is with advantage carried out as described in the previously mentioned application Serial No. 204,736. It is further advantageous in this stage, or in these stages, to maintain a temperature not exceeding the critical temperature of the hydrocarbon mixture and a pressure upwards of about 500 pounds per square inch and sufficient to prevent substantial vaporization. The final stage of catalyst contact, or the final two or three stages, may also be carried out with correlation of temperature and pressure, with respect to the stock, within the limits set forth in the previously mentioned application Serial No. 204,736. In general, however, it is advantageous in the final stage, or in the final stages, of catalyst contact to maintain temperatures and pressures, relatively high temperatures and relatively low pressures, most effective to promote complete reaction of unsaturates still present in the hydrocarbon mixture, by polymerization even to the exclusion of alkylation. For example, in the final stage of catalyst contact, a lower pressure not exceeding about 350 pounds per square inch and permitting substantial vaporization, even substantially complete vaporization, may be used with advantage.

Known condensation catalysts are generally useful in carrying out the process of the invention. The phosphoric acid catalysts will illustrate one type of catalyst which may be employed to advantage. An appropriate phosphoric acid catalyst may be prepared, for example, by mixing orthophosphoric acid or pyrophosphoric acid with an appropriate carrier, siliceous material such as kieselguhr or an aluminum silicate for example, and calcining the mixture at a temperature of 575° F. or 750° F. The calcined catalyst may comprise three parts by weight of the phosphoric acid compound and one part by weight of the carrier for example. The calcined mixture may be ground and sized or pelleted, or some carbonaceous material may be incorporated into the mixture prior to calcination to render the calcined product porous.

The accompanying drawing illustrates, diagrammatically, one arrangement of apparatus appropriate for carrying out the process of the invention. The drawing represents this apparatus in elevation with parts broken away.

In the apparatus illustrated in the drawing, normally gaseous hydrocarbons including saturates and unsaturates to be processed are forced from one or the other of the supply tanks 1 and 2 through connection 3, preheater 4, connection 5, catalyst chamber 6, connection 7, catalyst chamber 8 and cooler 9 into receiver 10 by means of pressure imposed by an inert gas such as nitrogen supplied from pressure vessels 11 and 12 through connection 13. Additional catalyst chambers, corresponding to catalyst chamber 6, may be interposed between chambers 6 and 8. For heating and for controlling the temperature of the hydrocarbon mixture passing therethrough, the preheater 4 and the several catalyst chambers are steam-jacketed and appropriately connected to a supply of steam, which may be superheated, through connection 14. The pressure receiver 10 discharges the liquid separated therein through connection 15 into receiving tank 16 which may also be maintained under pressure. Gases and uncondensed vapors are discharged from pressure receiver 10 through connection 17. Appropriate valves, pressure gauges and level gauges to control the flow of the pressure medium, of the hydrocarbon mixture being processed, of the heating medium and of the condensation products are provided as indicated in the drawing. Thermocouples to indicate the temperature of the mixture entering and leaving each of the catalyst chambers and at one or two points in passage therethrough are also provided.

In carrying out the process of the invention in the apparatus illustrated, the normally gaseous hydrocarbons including saturates and unsaturates are heated, in the preheater 4, to about the temperature maintained in the first catalyst chamber, for example to a temperature of about 200°–450° F. under a pressure high enough to maintain flow through the several catalyst chambers and into the pressure receiver 10. In the first catalyst chamber 6, a pressure for example of 500–1500 pounds per square inch and a temperature for example of 250°–350° F. are maintained. In the final catalyst chamber 8, a pressure lower than that in the first and ranging for example down to 150–350 pounds per square inch and a temperature for example of 350°–650° F. are maintained. Any intermediate catalyst chambers are operated under progressively diminishing intermediate pressures and at progressively increasing intermediate temperatures. In the cooler 9, the condensation products are brought to a temperature for example of 70°–90° F. and are discharged at this temperature into the pressure receiver 10 in which a pressure approximating that prevailing in the final catalyst chamber, chamber 8, is maintained. If the hydrocarbons supplied to the condensation include a substantial proportion of ethylene and ethane, the temperature in the first catalyst chamber is with advantage maintained at the lower end of the stated range since at higher temperatures within the range of temperature effecting alkylation an excessive proportion of such ethane and ethylene will react to form butane. In this circumstance, the temperature in the first catalyst chamber, or in the first two or three chambers of a longer series, is with advantage limited not to exceed about 325° F.

The following examples will further illustrate the process of the invention. In each of the examples, two catalyst chambers were used, the temperatures in the first and second chambers being 250° F., and 350° F., respectively, and the pressures in the first and second chambers being 1000 pounds per square inch and 700 pounds per square inch, respectively. The charging rate, in gallons per hour per pound of catalyst, the charge composition in mol percentage, and the yield, in gallons of $C_{5+}$ compounds within the boiling range of gasoline per gallon of charge, and the mol percentage of the product, $C_{5+}$ compounds within the boiling range of gasoline, consisting of saturated hydrocarbons are given in the following tabulation:

|  | Examples | | | |
| --- | --- | --- | --- | --- |
|  | I | II | III | IV |
| Charge rate in gals./hr./lb. catalyst | 0.0535 | 0.0575 | 0.111 | 0.055 |
| Charge composition in mol percent: | | | | |
| Ethane | | 1.5 | 14.0 | 8.7 |
| Propane | 30.1 | 14.8 | 22.1 | 18.1 |
| Butanes | 48.4 | 59.4 | 37.2 | 48.9 |
| Ethylene | | 9.2 | 2.3 | 1.7 |
| Propylene | 5.9 | 3.1 | 13.0 | 7.8 |
| Butylenes | 15.6 | 11.4 | 11.4 | 14.8 |
| Yield gals. ($C_{5+}$)/gal. charge | 0.17 | 0.12 | 0.14 | 0.16 |
| Alkylation, mol percent of reacting charge | 49 | 26 | 43 | 18 |

From about 20 mol percent. to about 50 mol percent. of the reacting charge reacted by alkylation. The mol percentage of the charge reacting in the foregoing examples, by alkylation and by polymerization, varied from about 17% to about 25%.

Since lower temperatures tend to promote alkylation and to suppress polymerization, and since higher temperatures within the range within which alkylation tends to be effected tend to promote polymerization and to suppress alkylation, and since in general higher pressures tend to promote alkylation, whereas lower pressures tend to promote polymerization, in the process of the invention conditions having a maximum tendency toward alkylation are maintained in the initial stage of catalyst contact and conditions having a maximum tendency toward polymerization are maintained in the final stage of catalyst contact. Under these conditions of operation, a maximum recovery by alkylation is combined with a maximum recovery of unsaturates by polymerization thus making possible improved recoveries of liquid products of gasoline boiling range with the superior properties characteristic of products of condensation by alkylation and improved utilization of unsaturated components of the hydrocarbon mixture processed.

I claim:

1. In the catalytic condensation of normally gaseous hydrocarbons including saturates and unsaturates to produce normally liquid hydrocarbons of gasoline boiling range, the improvement which comprises passing a mixture of such hydrocarbons consisting essentially of paraffinic and olefinic hydrocarbons in contact with a condensation catalyst at temperatures and under pressures effecting condensation in a plurality of successive stages, maintaining in the first stage a temperature not exceeding the critical temperature of the mixture and a pressure upwards of about 500 pounds per square inch and sufficient to prevent substantial vaporization thereby effecting substantial alkylation, and maintaining a lower pressure in the following stage.

2. In the catalytic condensation of normally gaseous hydrocarbons including saturates and unsaturates to produce normally liquid hydrocarbons of gasoline boiling range, the improvement which comprises passing a mixture of such hydrocarbons consisting essentially of paraffinic and olefinic hydrocarbons in contact with a condensation catalyst at temperatures and under pressures effecting condensation in a plurality of successive stages, maintaining in the first stage a temperature not exceeding the critical temperature of the mixture and a pressure upwards of about 500 pounds and sufficient to prevent substantial vaporization thereby effecting substantial alkylation, and maintaining a higher temperature and a lower pressure in the following stage.

3. In the catalytic condensation of normally gaseous hydrocarbons including saturates and unsaturates to produce normally liquid hydrocarbons of gasoline boiling range, the improvement which comprises passing a mixture of such hydrocarbons consisting essentially of paraffinic and olefinic hydrocarbons in contact with a condensation catalyst at temperatures and under pressures effecting condensation in a plurality of successive stages, maintaining in the first stage a temperature not exceeding the critical temperature of the mixture and a pressure upwards of about 500 pounds and sufficient to prevent substantial vaporization thereby effecting substantial alkylation, and maintaining a lower pressure permitting substantial vaporization in a following stage.

4. In the catalytic condensation of normally gaseous hydrocarbons including saturates and unsaturates to produce normally liquid hydrocarbons of gasoline boiling range, the improvement which comprises passing a mixture of such hydrocarbons consisting essentially of paraffinic and olefinic hydrocarbons in contact with a condensation catalyst at temperatures and under pressures effecting condensation in a plurality of successive stages, maintaining in the first stage a temperature and pressure effecting substantial alkylation, said last-mentioned pressure being upwards of about 500 pounds and maintaining in a following stage a lower pressure and a higher temperature effecting substantial polymerization.

5. In the catalytic condensation of normally gaseous hydrocarbons including saturates and unsaturates to produce normally liquid hydrocarbons of gasoline boiling range, the improvement which comprises passing a mixture of such hydrocarbons consisting essentially of paraffinic and olefinic hydrocarbons in contact with a condensation catalyst at temperatures and under pressures effecting condensation in a plurality of successive stages, maintaining in the first stage a temperature and a pressure effecting substantial alkylation said last-mentioned pressure being upwards of about 500 pounds per square inch and said last-mentioned temperature being less than about 450° F., and maintaining in a following stage a temperature higher than that prevailing in the first stage and a pressure not exceeding about 350 pounds per square inch.

RODERICK DONALD PINKERTON.